United States Patent
Meier

(10) Patent No.: US 12,313,208 B2
(45) Date of Patent: May 27, 2025

(54) BODY OF A SANITARY FITTING HAVING AN ANTI-CORROSION LAYER AND A METHOD FOR MANUFACTURING SUCH A BODY

(71) Applicant: GROHE AG, Hemer (DE)

(72) Inventor: Torsten Meier, Neuss (DE)

(73) Assignee: GROHE AG, Hemer (DE)

( * ) Notice: Subject to any disclaimer, the term of this patent is extended or adjusted under 35 U.S.C. 154(b) by 168 days.

(21) Appl. No.: 17/795,352

(22) PCT Filed: Sep. 28, 2020

(86) PCT No.: PCT/EP2020/077078
§ 371 (c)(1),
(2) Date: Jul. 26, 2022

(87) PCT Pub. No.: WO2021/151528
PCT Pub. Date: Aug. 5, 2021

(65) Prior Publication Data
US 2023/0053546 A1  Feb. 23, 2023

(30) Foreign Application Priority Data
Jan. 31, 2020 (DE) ............... 10 2020 102 435.5

(51) Int. Cl.
| | |
|---|---|
| *F16L 58/08* | (2006.01) |
| *B05D 3/02* | (2006.01) |
| *B05D 7/16* | (2006.01) |
| *B05D 7/22* | (2006.01) |
| *E03C 1/04* | (2006.01) |

(52) U.S. Cl.
CPC ............ *F16L 58/08* (2013.01); *B05D 3/0254* (2013.01); *B05D 7/16* (2013.01); *E03C 1/0404* (2013.01)

(58) Field of Classification Search
None
See application file for complete search history.

(56) References Cited

U.S. PATENT DOCUMENTS

| | | | | |
|---|---|---|---|---|
| 4,882,126 A | * | 11/1989 | Okada | C22C 18/04 420/516 |
| 5,888,623 A | * | 3/1999 | Katzer | B41M 5/03 428/209 |
| 2010/0137504 A1 | * | 6/2010 | Kuhlmann | C08G 18/672 524/556 |

FOREIGN PATENT DOCUMENTS

| | | | | |
|---|---|---|---|---|
| DE | 35 15 718 | | 11/1986 | |
| DE | 43 12 103 | | 10/1994 | |
| DE | 102 57 133 | | 9/2004 | |
| DE | 10257133 A1 | * | 9/2004 | ............ B05D 5/083 |

(Continued)

OTHER PUBLICATIONS

International Search Report issued Jan. 22, 2021, in International (PCT) Application No. PCT/EP2020/077078, with English translation.

*Primary Examiner* — Alexander M Weddle
(74) *Attorney, Agent, or Firm* — Wenderoth, Lind & Ponack, L.L.P.

(57) ABSTRACT

A method for manufacturing a body for a sanitary fitting that involves the following steps: provision of the body, wherein the body contains at least partially a zinc alloy and has at least one area for guiding a liquid; and coating the at least one area using an anti-corrosion coating, wherein the anti-corrosion coating is at least partially formed of a polymeric material.

9 Claims, 1 Drawing Sheet

(56) References Cited

FOREIGN PATENT DOCUMENTS

WO     2005/045144     5/2005
WO     2013/167210     11/2013

* cited by examiner

BODY OF A SANITARY FITTING HAVING AN ANTI-CORROSION LAYER AND A METHOD FOR MANUFACTURING SUCH A BODY

This invention relates to a method for manufacturing a body for a sanitary fitting. Such sanitary fittings, in particular, can be used to dispense a liquid at a sink, shower and/or bathtub. In addition, the invention relates to a matching body for a sanitary fitting.

Sanitary fittings can be used in particular for mixing cold water and hot water to form a mixed water having a desired mixed-water temperature and for dosing the mixed water. In known sanitary fittings, the mixed water is routed from a mixing cartridge to an outlet opening of an outlet of the body via fluids ducts in a body of the sanitary fitting. Because the water is in contact with the body during this process, bodies must be made of a material suitable for drinking water and not susceptible to corrosion, such as brass. To be able to use less expensive materials for bodies, there are known sanitary fittings, in which the fluids ducts in the body are formed by plastic inserts. The plastic inserts prevent contact of the mixed water and the body. However, the manufacture and assembly of the plastic inserts result in high costs.

Therefore the invention addresses the problem of solving at least a part of the issues described with reference to the prior art and, in particular, of providing a method for manufacturing a body for a sanitary fitting, which renders the use of plastic inserts in at least one area of the body unnecessary. In addition, a body for a sanitary fitting is also to be disclosed, in which the use of plastic inserts is not necessary in at least one area of the body.

These problems are solved by a method and a body according to the features of the independent claim. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A method for manufacturing a body for a sanitary fitting having at least the components listed below contributes to solving the problem:
 a) Provision of the body, wherein the body consists at least partially of a zinc alloy and has at least one area for guiding a liquid; and
 b) Coating the at least one area with an anti-corrosion coating, wherein the anti-corrosion coating is at least partially formed of a polymeric material.

In step a), first the body is provided. The body can be used in particular for a sanitary fitting, which is used to mix a cold water and hot water to form a mixed water having a desired mixed-water temperature and/or to meter the mixed water. Such sanitary fittings are regularly used for sinks, washbasins, showers and/or bathtubs. In particular, the body can be designed in the manner of a valve body, a component for forming the valve body (such as a body half shell) or a component for a valve body. In addition, the body can have a (protruding or branching) outlet that is rigidly or movably connected to the fitting body. The body and/or the outlet can be at least partially tubular. The body can be attachable to a support, such as a countertop, a sink, a washbasin, the shower, the bathtub, or a wall. Further, the valve body may have a decorative outer surface. In addition, the body and/or the outlet can have an outlet opening through which a liquid, in particular (mixed) water, can be dispensed.

The body consists at least partially or completely of a zinc alloy. The zinc alloy is in particular a metal alloy whose main component or base metal is zinc (Zn). In particular, this may mean that zinc has the largest mass fraction compared to the other alloying components of the zinc alloy. The zinc alloy or zinc has a different crystal structure compared to that of copper or that of a copper alloy such as brass, i.e., its structure is hexagonal instead of face-centered cubic. The zinc alloy can in particular be a so-called zamak alloy. Further alloying constituents the zinc alloy may comprise are, for instance, at least aluminum (Al), magnesium (Mg) and/or copper (Cu). In particular, the zinc alloy may include the following mass fractions of alloying components:
 a) 3.8-4.2% Al, 0.035-0.06% Mg, balance (in particular) Zn (zamak alloy ZL0400),
 b) 3.8-4.2% Al, 0.7-1.1% Cu, 0.035-0.06% Mg, balance (in particular) Zn (zamak alloy ZL0410) or
 c) 3.8-4.2% Al, 2.7-3.3% Cu, 0.035-0.06% Mg, balance (in particular) Zn (zamak alloy ZL0430).

Furthermore, the body has at least one area for guiding a liquid. This at least one area may be, in particular, an inner surface of the body, a liquids duct, a section of a liquids duct, and/or an area of a liquids duct. In particular, the at least one area may at least partially delimit a liquids duct of the body. In particular, the at least one area is in contact with the liquid when the sanitary fitting is in use. In particular, the liquid may be water, cold water, hot water and/or mixed water.

After step a), in a step b), the at least one area for supplying the liquid is coated with an anti-corrosion layer. The coating does not have to be limited to the area for guiding the liquid, but can also be applied in other areas of the body. For instance, an entire inner surface of the body and/or the outlet can be coated with the anti-corrosion coating. The anti-corrosion coating adheres firmly to the body or to the at least one area for guiding the liquid, if applicable after the anti-corrosion coating has hardened and/or solidified. The corrosion protection layer consists at least in part of a polymeric material. The polymeric material is in particular at least partially a plastic or a synthetic resin, such as epoxy resin. In particular, a hardener can be used to cure or solidify the synthetic resin. In particular, the corrosion protection layer prevents any (direct) contact of the liquid with the zinc alloy of the body and in that way any corrosion of the body. In this way, the use of plastic inserts can be avoided, at least in the areas where the body is coated with the anti-corrosion layer.

The zinc alloy may contain a mass fraction of zinc of more than 80%. In particular, the zinc alloy may contain zinc at a mass fraction of more than 90% or 95%.

Prior to step a), the body may be manufactured using a zinc die casting process. In the zinc die-casting process, in particular a liquid melt of the zinc alloy is forced under pressure into a die-casting mold. After the melt has solidified, the body can be demolded and, if applicable, machined. The body is therefore in particular a zinc die-cast part.

In step b), the coating of the at least one area may be performed without prior treatment of the at least one area. In particular, the treatment may be a mechanical and/or chemical treatment of the surface of the at least one area.

In step b), the coating process can consist of painting, immersing or spinning. Painting can be performed, for instance, by using a spray nozzle to apply the anti-corrosion coating. For immersion, the body may in particular be at least partially immersed in a bath of a liquid coating agent.

For spinning, the coating agent can be introduced into the body and then distributed in the body by means of centrifugal force.

In step b), the corrosion protection layer can be formed with a layer thickness of 50 μm (micrometers) to 2 mm (millimeters). A lower coating thickness cannot reliably prevent corrosion, in particular in the form of filiform corrosion. A greater layer thickness can result in an undesirable narrowing of the area for guiding the liquid or of a flow cross-section of the liquids duct and/or in an unnecessarily high material input for forming the corrosion protection layer.

After step b), the anti-corrosion layer can be solidified at a room temperature in step c). The room temperature can be, for instance, 10° C. to 30° C., preferably 15° C. to 25° C.

After step b), heat can be used to solidify the corrosion protection layer in step c). In particular, the heat can accelerate the solidification of the corrosion protection layer. For this purpose, the anti-corrosion layer can be heated, for instance, to a temperature of 20° C. to 60° C., preferably 20° C. to 40° C.

The polymeric material may be, at least in part, polytetrafluoroethylene, polypropylene, or polystyrene. In other words, this can mean that the corrosion protection layer is at least partially made of polytetrafluoroethylene, polypropylene and/or polystyrene.

According to a further aspect, a body for a sanitary fitting is also proposed, wherein the body is at least partially made of a zinc alloy and comprises at least one area for guiding a liquid, and wherein the at least one area is coated with an anti-corrosion layer, which is at least partially made of a polymeric material.

In particular, the body is manufactured in accordance with the method proposed herein.

For further details of the body, full reference is made to the explanations of the body within the scope of the process description.

The invention and the technical environment are explained in more detail below with reference to the figures. It should be noted that the figures show a particularly preferred embodiment variant of the invention, but the invention is not limited thereto. The same reference signs are used for the same components in the figures. Schematically:

Figure 1:
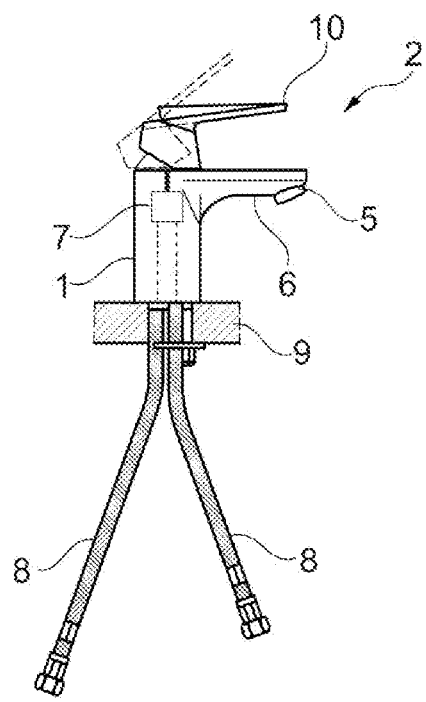
FIG. 1 shows a lateral view of a sanitary fitting.

FIG. 1 shows a side view of the sanitary fitting 2. The sanitary fitting 2 has a body 1 having an outlet 6 with an outlet opening 5. The body 1 is attached to a support 9, which in this case may be a wash basin. A mixing cartridge 7 is arranged in the body 1, to which cold water and hot water can be routed separately via supply lines 8. The mixing cartridge 7 can be used to mix the cold water and the hot water to form a mixed water having a desired mixed-water temperature. The mixing cartridge 7 is connected to the outlet opening 5 in a fluid conveying manner, for the mixed water to be discharged via the outlet opening 5. In so doing, the mixed water contacts an area 3 of the body 1 shown in FIG. 2. Furthermore, a lever 10 can be used to actuate the mixing cartridge 7, which lever can be used to adjust the mixed-water temperature and a discharge quantity of the mixed water via the outlet opening 5.

Figure 2:
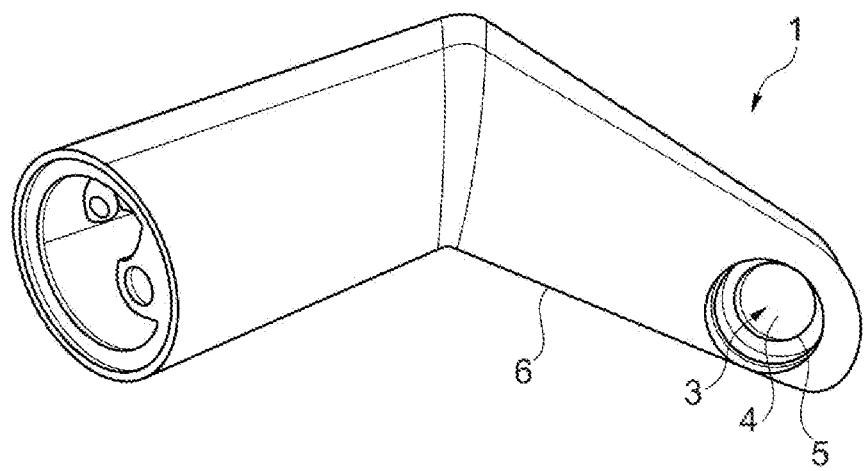
FIG. 2 shows a perspective view of a body of a sanitary fitting.

FIG. 2 shows a perspective view of the body 1 of the sanitary fitting 2 of FIG. 1. In FIG. 1, the view is through the outlet opening 5 of the outlet 6 towards an area 3 of the body 1, which is used to guide the mixed water. The area 3 of the body 1 is an inner surface of the outlet 6.

In the manufacture of the body 1, the body 1 was first provided in a step a) and then, in a step b), an anti-corrosion layer 4 was applied to the area 3. The anti-corrosion layer 4 prevents the area 3 from corroding due to contact with the mixed water.

This invention can at least reduce a use of plastic inserts to prevent contact of the mixed water with the body.

LIST OF REFERENCE NUMERALS 1 body
2 sanitary fitting
3 area
4 anti-corrosion coating
5 outlet opening
6 outlet
7 mixing cartridge
8 supply line
9 support
10 lever

The invention claimed is:

1. A method for manufacturing a body (1) for a sanitary fitting (2), the method comprising the steps listed below:
    a) providing the body (1) comprising an outlet (6) with an outlet opening (5) through which a liquid can be dispensed,
        wherein the body (1) comprises a zinc alloy, the zinc alloy comprising zinc in a largest mass fraction compared to other alloying components of the zinc alloy, and
        wherein the body (1) comprises at least one area (3) for guiding the liquid through an interior of the body (1), the at least one area (3) being an inner surface of the body, a liquids duct, a section of a liquids duct, and/or an area of a liquids duct;
    b) coating the at least one area (3) for guiding the liquid using an anti-corrosion coating (4) such that the anti-corrosion coating (4) prevents direct contact of the liquid with the zinc alloy of the body (1) when the body (1) is being used; and
    c) curing the anti-corrosion coating (4) with a hardener at a temperature of 10° C. to 60° C.,
        wherein the anti-corrosion coating (4) is at least partially formed of a polymeric material selected from the group consisting of polypropylene, polystyrene, and epoxy, and
        wherein the anti-corrosion coating (4) has a layer thickness of 50 μm to 2 mm,
    wherein the body (1) does not include plastic inserts in at least the at least one area (3).

2. The method according to claim 1, wherein the zinc alloy contains zinc at a mass fraction greater than 80%.

3. The method according to claim 1, wherein the body (1) is manufactured by a zinc die-casting process before step a) is performed.

4. The method according to claim 1, wherein the at least one area (3) for guiding the liquid is not pretreated with a mechanical and/or a chemical treatment before being coated using the anti-corrosion coating (4) in step b).

5. The method according to claim 1, wherein the coating in step b) is applied by painting, immersing or spinning.

6. The method according to claim 1, wherein, after step b), the anti-corrosion layer (4) is solidified at a 10° C. to 30° C. in step c).

7. The method according to claim 1, wherein, after step b), heat is used to solidify the corrosion protection layer (4) at a temperature of 20° C. to 60° C. in step c).

8. A body (1) for a sanitary fitting (2), the body (1) comprising
- an outlet (6) with an outlet opening (5) through which a liquid can be dispensed, and
- at least one area (3) for guiding the liquid through an interior of the body (1), the at least one area (3) being an inner surface of the body, a liquids duct, a section of a liquids duct, and/or an area of a liquids duct
- wherein the body (1) comprises a zinc alloy, the zinc alloy comprising zinc in a largest mass fraction compared to other alloying components of the zinc alloy,
- wherein the at least one area (3) for guiding the liquid is coated with a corrosion protection layer (4) comprising a polymeric material such that the anti-corrosion coating (4) prevents direct contact of the liquid with the zinc alloy of the body (1) when the body (1) is being used,
- wherein the polymeric material is selected from the group consisting of polypropylene, polystyrene, and epoxy,
- wherein the corrosion protection layer (4) has a layer thickness of 50 $\mu$m to 2 mm, and
- wherein the body (1) does not include plastic inserts in at least the at least one area (3).

9. The body (1) for a sanitary fitting (2) according to claim 8, wherein the zinc alloy contains zinc at a mass fraction greater than 80%.

* * * * *